United States Patent
Oram et al.

(10) Patent No.: US 8,135,648 B2
(45) Date of Patent: Mar. 13, 2012

(54) AUTHENTICATION OF LOTTERY TICKETS, GAME MACHINE CREDIT VOUCHERS, AND OTHER ITEMS

(75) Inventors: Thomas K. Oram, Hudson, MA (US); Chenghui Luo, East Greenwich, RI (US); Johan Berg, Solna (SE)

(73) Assignee: GTECH Corporation, Providence, RI (US)

( * ) Notice: Subject to any disclaimer, the term of this patent is extended or adjusted under 35 U.S.C. 154(b) by 729 days.

(21) Appl. No.: 12/264,199

(22) Filed: Nov. 3, 2008

(65) Prior Publication Data

US 2009/0117997 A1 May 7, 2009

Related U.S. Application Data

(60) Provisional application No. 61/001,609, filed on Nov. 1, 2007.

(51) Int. Cl.
- *G06Q 20/00* (2006.01)
- *A63F 13/00* (2006.01)
- *A63F 9/00* (2006.01)

(52) U.S. Cl. ............ 705/67; 705/64; 463/17; 463/25; 463/29; 463/42

(58) Field of Classification Search ............ 463/17, 463/25, 29; 705/44, 67
See application file for complete search history.

(56) References Cited

U.S. PATENT DOCUMENTS

| | | | |
|---|---|---|---|
| 6,185,682 B1 * | 2/2001 | Tang | 713/168 |
| 6,308,165 B1 * | 10/2001 | Gilham | 705/62 |
| 6,368,219 B1 * | 4/2002 | Szrek et al. | 463/42 |
| 6,679,775 B1 * | 1/2004 | Luciano et al. | 463/25 |
| 6,729,957 B2 * | 5/2004 | Burns et al. | 463/25 |
| 6,746,330 B2 * | 6/2004 | Cannon | 463/25 |
| 7,089,420 B1 * | 8/2006 | Durst et al. | 713/176 |
| 7,406,602 B2 * | 7/2008 | Gauselmann | 713/187 |
| 7,419,428 B2 * | 9/2008 | Rowe | 463/25 |
| 7,454,363 B1 * | 11/2008 | Rowe | 705/14.12 |
| 7,749,080 B2 * | 7/2010 | Szrek et al. | 463/29 |
| 7,809,649 B2 * | 10/2010 | Gilham | 705/62 |
| 2004/0023711 A1 * | 2/2004 | Knapp | 463/17 |
| 2006/0136749 A1 * | 6/2006 | Satou et al. | 713/193 |
| 2007/0021191 A1 * | 1/2007 | White et al. | 463/25 |

* cited by examiner

*Primary Examiner* — Calvin L Hewitt, II
*Assistant Examiner* — Steven Kim
(74) *Attorney, Agent, or Firm* — Williams Mullen, PC; Thomas F. Bergert

(57) ABSTRACT

Credit vouchers from a wagering game machine can be authenticated. This may be accomplished by receiving credit information at a server, the credit information including information indicating a player's balance at the wagering game machine. A security key may be created for the credit voucher. A secured document token may be created by encrypting a document token including the credit information with the security key. This document token may sent to a server which supplies a credit response. A modified security key may be created by combining the credit response with the security key. The credit voucher may be provided, the credit vouchers including the credit information, the credit response and the modified security key.

14 Claims, 10 Drawing Sheets

AUTHENTICATION OF LOTTERY TICKETS, GAME MACHINE CREDIT VOUCHERS, AND OTHER ITEMS

CROSS-NOTING TO RELATED APPLICATION AND PRIORITY CLAIM

This application claims priority under 35 U.S.C. 119(e) to U.S. Provisional Application No. 61/001,609, filed Nov. 1, 2007, entitled: "AUTHENTICATION OF LOTTERY TICKETS AND OTHER ITEMS". The entire disclosure of said provisional application is incorporated herein by reference thereto.

BACKGROUND

There are many cases where a specific document or item has significant value, such as lottery tickets, cash-out tickets from slot machines, video lottery terminals or other gaming machines, promotional games where presenting a certain item, such as a bottle top, results in the presenter winning a prize, sweepstakes tickets, promotional coupons or vouchers, store credit slips, and event tickets to popular venues (football games, concerts, etc.). Such items, which may be printed or electronic documents, are often provided with a unique identifier, such as a serial number, that can then be checked against a list of item values or winners or valid items, in order to determine whether an item tendered for redemption or use is an authentic item.

In many cases, a database of all issued documents, containing sufficient information to recreate the document, is kept at a central location. As these documents are redeemed, their database entries are so marked.

With some lottery games, a player attempts to predict the outcome of some future event. For example, a player may select 6 numbers from the values 1 to 49, hoping that those 6 values will be randomly drawn by the Lottery on a specific future date. When that future date arrives, the Lottery randomly may pick 6 numbers from 1 to 49, called Winning Numbers. The player may win a prize based on the number of his selections that match the Winning Numbers. Sometimes, the prize for matching all 6 numbers is quite high—perhaps millions of dollars.

When the player places his original wager, all information about the wager is typically placed in a database, and that information is included on a wager receipt, e.g., by printing it on a printed wager receipt, storing it on a smart card or other electronic media, etc. When the winning numbers are known, it is possible to scan the database and recognize which tickets are winners. Normally, the amount won is also included in the database, although for future draw lotteries this information will not be known until after a drawing occurs. When a winning wager is redeemed or cashed, it will typically be marked as such to prevent the same wager from being cashed again.

SUMMARY

We have recognized that it may be possible for an unscrupulous insider, with access to a list of redeemable winning or valid items that have not yet been presented for redemption, to create a copy of that winning or valid item which cannot be readily distinguished from the original, e.g., by including the serial number of the authentic item. Such a forged item might then be presented for redemption as if it were an original, because it has the proper serial number, and be fraudulently redeemed. For example, an unscrupulous insider with access to a list of winning lottery tickets that have not been redeemed may create a fake lottery ticket with the identification information for a missing winning lottery ticket and present it for redemption, particularly at the end of the redemption period, when it is more likely that the genuine winning ticket has been lost or destroyed inadvertently.

There have been many solutions implemented to prevent an insider from successfully forging a wager receipt, but these solutions typically require significant manual activity by a Lottery Security Officer, and therefore are implemented only for wagers that win a large amount of money (e.g., millions of dollars). It is thus possible for an insider to forge one or more wager receipts for winners that do not win a large amount, knowing that the manual authentication activity may not be performed.

There is therefore a need to develop a system and method that will allow any wager receipt or any other redeemable document to be authenticated electronically, without manual intervention, yet denying an insider the ability to forge the document.

DETAILED DESCRIPTION OF EXAMPLE EMBODIMENTS

Figure 1:
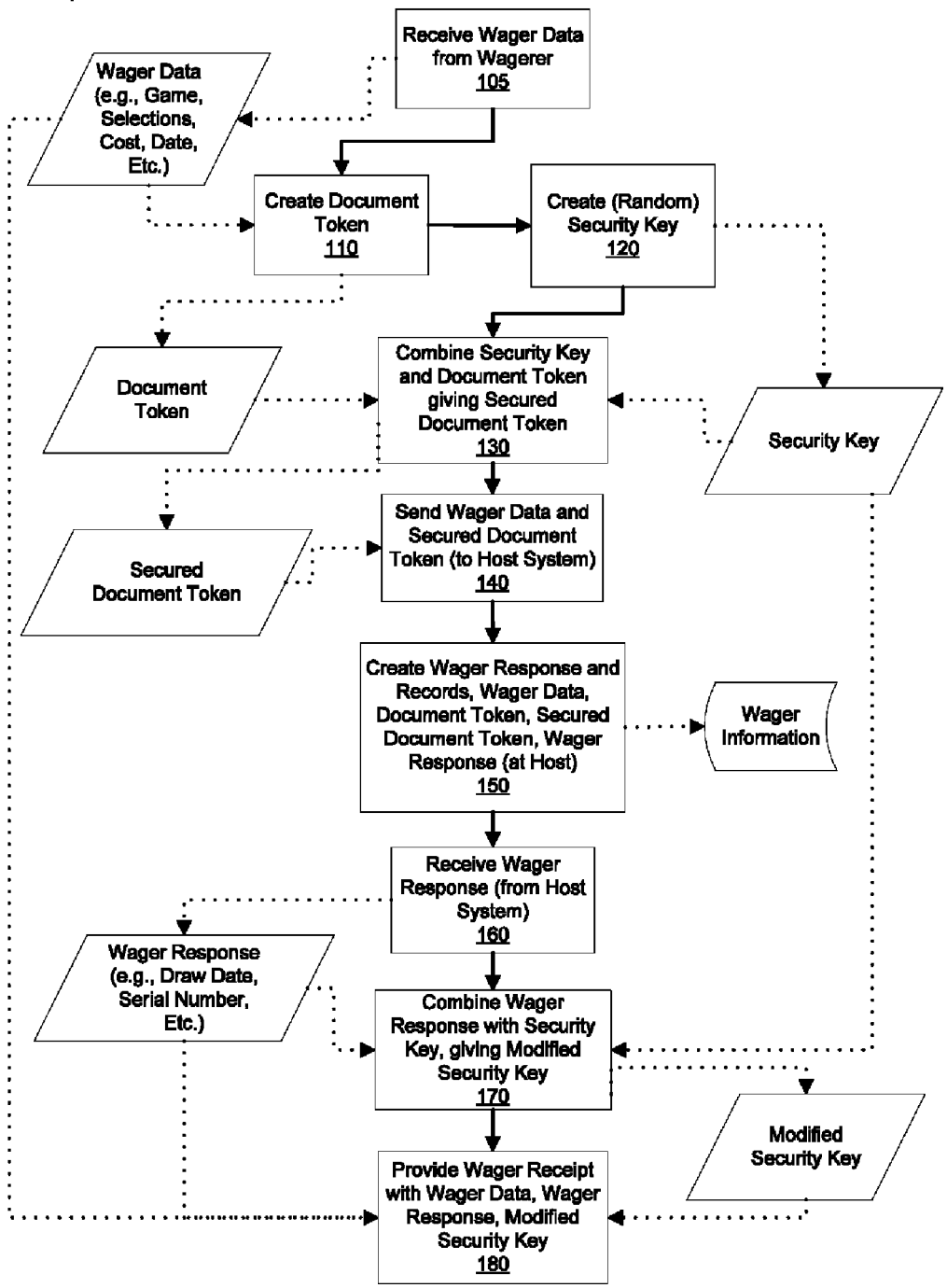
FIG. 1 illustrates an example procedure for authenticating a wagering transaction, according to an example embodiment of the present invention.

Some example embodiments of the present invention include systems and methods for providing secure items, such as documents, receipts, or wager entries, and for authenticating such documents, receipts, or wager entries. For example, one example embodiment includes a procedure and system for providing secure lottery tickets for a future draw lottery and authenticating those tickets. In a conventional system, where a central ticket record or winner file tracks the status and value of issued tickets, an unscrupulous insider could forge tickets by identifying winning tickets in the winner file and creating forged tickets with the winning tickets' identification information. In the example embodiments described below, the records stored on the host system (and thus accessible to insiders) contain identifying information for issued receipts or tickets in a securely encrypted form, so that an unscrupulous insider cannot reproduce such tickets even with access to the ticket records or winner files. In these example embodiments, a document, such as a wagering receipt, lottery ticket, or wagering machine credit voucher, may be authenticated by purely electronic means, without manual intervention, while still preventing an insider with access to a database from re-creating the document.

One example embodiment of the present invention includes a method of authenticating a wager receipt presented for redemption in a wagering game. The method may include: receiving wagering information; transmitting the wagering information to a server; creating a security key for the wager receipt; creating a secured document token by encrypting a document token including the wager information with the security key; sending to secured document token to the server; sending a wager response from the server; creating a modified security key by combining the wager response with the security key; and providing a wager receipt including the wager data, the wager response and the modified security key.

The method may further include: receiving a request to redeem the wager receipt; receiving the modified security key from the wager receipt; retrieving the wager data, the secured document token, the document token and the wager response corresponding to the wager receipt; obtaining a candidate security key from the modified security key; encrypting the retrieved document token using the candidate security key to obtain a candidate wager token; and responsive to the candidate wager token matching the retrieved secured document token, indicating the wager receipt is authentic.

Optionally, in the method, at least a portion of the wagering information may include player wagering selections for the wagering game received from a player at a client machine, the wagering information may be transmitted from the client machine to the server via a network, the security key may be a random or pseudo-random number generated at the client machine, the wager response may be generated at the server and transmitted via the network to the client machine, and the modified security key may be created at the client machine.

Optionally, in the method, providing the wager receipt may include printing a wager receipt with a machine-readable code including modified security key.

Optionally, the machine-readable code may be a two-dimensional bar code.

Optionally, the wager data and the wager response may also be printed on the wager receipt.

Optionally, the wager receipt may be a future draw lottery ticket.

Optionally, the player wager selections may include the player's number selections for the future draw lottery.

Optionally, the encrypting may include at least one of a symmetric encryption algorithm or creation of a cryptographic hash of the combination.

Optionally, the encryption may include at least one of DES, Triple DES, AES, MD5, SHA-1, or HMAC.

Another example embodiment of the present invention includes a method of authenticating a credit voucher from a wagering game machine. The method may include receiving credit information at a server, the credit information including information indicating a player's balance at a gaming machine; creating a security key for the credit voucher; creating a secured document token by encrypting a document token including the credit information with the security key; sending the secured document token to the server; sending a credit response from the server; creating a modified security key by combining the credit response with the security key; and providing a credit voucher at the game machine, the credit voucher including the credit information, the credit response and the modified security key.

The method may further include: receiving a request to redeem the credit voucher for at least one of cash or game credit; receiving the modified security key from the credit voucher; retrieving the credit information, the secured document token, the document token and the credit response corresponding to the credit voucher; obtaining a candidate security key from the modified security key; encrypting the retrieved document token using the candidate security key to obtain a candidate secured document token; and responsive to the candidate secured document token matching the retrieved secured document token, indicating the credit voucher is authentic.

Optionally, the credit information may be transmitted from the gaming machine to the server via a network, the security key may be a random or pseudo-random number generated at the gaming machine, the wager response may be generated at the server and transmitted via the network to the gaming machine, and the modified security key may be created at the gaming machine.

Optionally, providing the credit voucher may include printing a credit voucher with a machine-readable code including modified security key.

Optionally, the machine-readable code may be a two-dimensional bar code.

Optionally, the credit information and the credit response may also be printed on the credit voucher.

Optionally, the encrypting may include at least one of a symmetric encryption algorithm or creation of a cryptographic hash of the combination.

Optionally, the encryption may include at least one of DES, Triple DES, AES, MD5, SHA-1, or HMAC.

Optionally, the gaming machine may be a video slot machine.

Optionally, the gaming machine may be a video lottery terminal.

Optionally, the request to redeem may be received at a dedicated redemption terminal, and the method may further include, responsive to the indication that the credit voucher is authentic, paying the voucher holder cash equivalent to the value of the credit voucher.

Optionally, the request to redeem may occur at a different gaming machine, and the method may further include, responsive to the indication that the credit voucher is authentic, providing game credit at the different game machine equivalent to the value of the credit voucher.

For any of the above example methods, a computer-readable storage medium may be provided which is encoded with instructions configured to be executed by a processor, the instructions which, when executed by the processor, cause the performance of the method, or of some portion of the method.

Another example embodiment of the present invention includes a system for authenticating a wager receipt. The system may include a client configured to create a security key and to encrypt a document token including wager information using the security key; a host configured to receive the document token and the encrypted document token from the client, and to provide a wager response to the client; the client further configured to generate a receipt including the wager information and a modified security key created using the security key and wager response, and the wager response; a redemption client configured to receive the wager receipt for redemption, and to transmit the modified security key and a receipt identifier to the host; and the host further configured to determine the authenticity of the wager receipt by extracting a candidate security key from the modified security key, creating a candidate document token by encrypting the document token associated with the wager receipt using the candidate security key to obtain a candidate document token, and comparing the candidate document token with the encrypted document token.

Optionally, the system may further include a client security module at the client, configured to generate pseudo-randomly generate the security key.

Optionally, the system may further include a host security module at the host, configured to determine the authenticity of the wager receipt by extracting a candidate security key from the modified security key, creating a candidate document token by encrypting the document token associated with the wager receipt using the candidate security key to obtain a candidate document token, and comparing the candidate document token with the encrypted document token Optionally, the system may further include a database accessible to the host, the database configured to store wager records, each wager record including the wager information associated with the wager, wager response associated with the wager, and secured document token associated with the wager.

Optionally, the system may further include a wager receipt generation module configured to cause the client to print the wager receipt including the wager information, the modified security key, and the wager response.

Optionally, the client and the redemption client may be the same client. Alternatively, they may be different clients.

FIG. 1 illustrates an example procedure for a wagering transaction, according to an example embodiment of the present invention. While the procedure is described primarily with respect to an entry in a future draw lottery, the example procedure may be modified for other purposes. In the figure, thick lines illustrate flow of control, while thin, broken lines indicate data flow.

In 105 wager data may be received. The wager data may include a player's entry numbers for a future draw lottery, e.g., the player's guess or "lucky number" that predicts the outcome of a future event such as a lottery drawing. Some wagering information may be received directly from a wageror, e.g., by having the wageror input data directly in a computer, cell phone, unattended kiosk, or other client machine. Alternatively, the wageror may communicate with a clerk, who may enter the data at a clerk-operated client machine, or the wageror may supply a playslip or other tangible object that stores the wager's wagering information. In addition, the wager information may also include other information such as information identifying the particular drawing or game for which a wager is being placed, the player's selection of a "quick pick" and resulting system selected entry numbers, the price point or amount wagered, etc. Some wager data may also be determined automatically, rather than being received from the wageror, e.g., the date the wager is being made and other information.

In 110 a document token may be created. The document token may be a hash or other representation of the wagering information which will be provided on the lottery receipt, ticket, or other document which needs to be securely authenticated.

In 120, a random security key may be created. For example, the security key may be a 128-bit number which may be generated using a cryptographically secure pseudo-random number generation scheme at a client terminal where the receipt for the transaction may be issued. While smaller keys may be used, they will be less secure. Larger keys are more secure and require more computing horsepower to handle transactions and authentication, which may be an issue in a large system handling a very large number of transactions in real time.

In 130, the document token and security key may be combined to produce a secured document token. The secured document token may be an encryption of the document token using an encryption algorithm with the security key as the encryption key, for example, using a symmetric encryption algorithm such as DES, Triple DES or AES. Alternatively, a cryptographic hash of the security key and the document token may be created using a hash routine such as MD5 or SHA-1 or other Keyed-Hash Message Authenticate Code (HMAC).

In 140, the wager data and secured document token may be stored, e.g., by delivering them to a central database or host system. The wager data may be stored in its raw form, or the saved document token may be sent and/or stored instead.

In 150, the wager data, document token, and secured document token may be stored, e.g., in the host database. The rest of the procedure may also be conducted using only the secured document token. However, to further improve the security of the procedure, a wager response may also be created and stored. The wager response may be created using a separate key or cryptographic hash at the host system, or by other approaches that supply additional information to the client from the host. The wager response may be sent to the client system.

In 160, the wager response may be received, e.g., from the host at the client terminal.

In 170, the wager response may be combined with the security key to give a modified security key. This combination may be accomplished by a further encryption step, or by using a cryptographic hash, or by other approaches.

In 180, the modified security key (or the secured document token if no wager response is employed) may be provided to the recipient of the item to be secured, e.g., as a lottery ticket or other wagering receipt supplied to the wageror. This may be achieved, e.g., by printing a numeric, barcode, or other representation of the modified security key on the receipt or ticket. Alternatively, the modified security key (or the secured document token, if no wager response is employed) may be provided electronically to the wageror, e.g., as an electronic receipt stored on a cell phone or personal computer, or as information stored on a smart card or other form of electronic storage medium. The receipt or ticket may also include the wager data in either its original or hashed form, or both, and the wager response, as well as the modified security key. For ease of administration, an unencrypted serial number may also be stored in the database and printed on the ticket.

Figure 2:
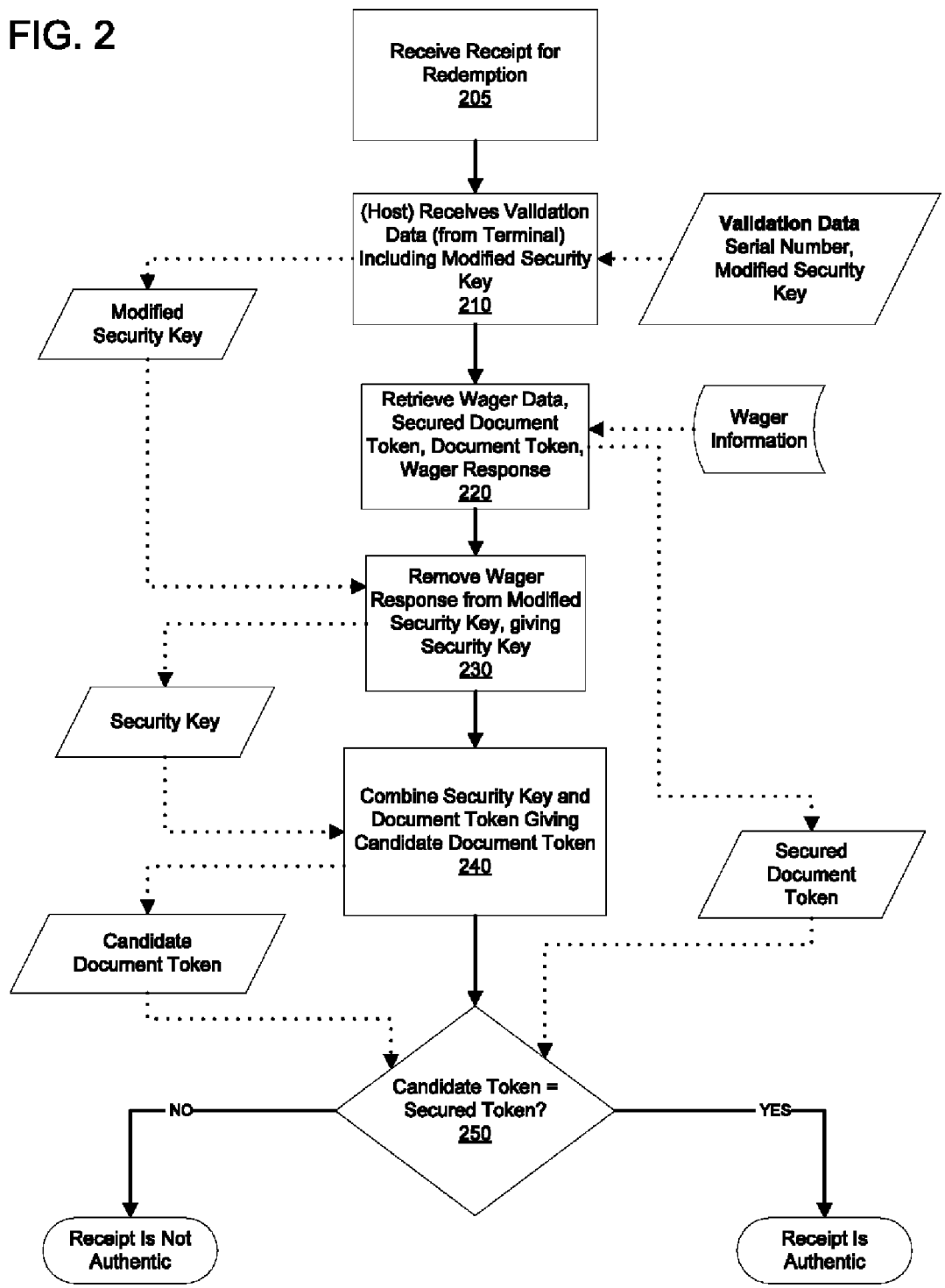
FIG. 2 illustrates an example procedure for authenticating a wagering receipt, according to an example embodiment of the present invention.

FIG. 2 illustrates an example authentication procedure for authenticating a receipt or lottery ticket presented for redemption. In 205, the receipt (or information from the receipt) may be received when the receipt is tendered for redemption. It will be appreciated that the receipt might not need to be physically tendered, particularly if the receipt is in electronic form. It will also be appreciated that the tickets or receipt may be redeemed at the same client where they are received, or may alternatively be redeemed at different clients, e.g., at clients dedicated to redemptions.

In 210, validation data from the receipt or ticket may be received. This information may include the modified security key from the receipt or ticket, as well as the unencrypted serial number. For example, the receipt or ticket may be scanned using a bar code scanner at a redemption terminal. All the retrieved data may be sent from the client to the host system.

In 220, the wager data, secured document token, document token, and wager response may be retrieved, e.g., from the wager database at the host using the serial number as a lookup index.

In 230, the wager response may be removed from the modified security key, to give the security key, e.g., by decrypting the modified security key.

In 240, the security key may be combined with the document token to create a candidate document token, e.g., by encrypting the document token using the same encryption procedure that was used to create the secure document token when the receipt was created.

In 250, the candidate token and the secure token may be compared. If the candidate token is the same as the secure token, the receipt presented for redemption is authentic. Otherwise, the receipt is invalid. The outcome of this authentication can be communicated to the client, so that appropriate action can be taken, e.g., the appropriate prize can be given to the ticket holder at the client terminal.

Figure 3:
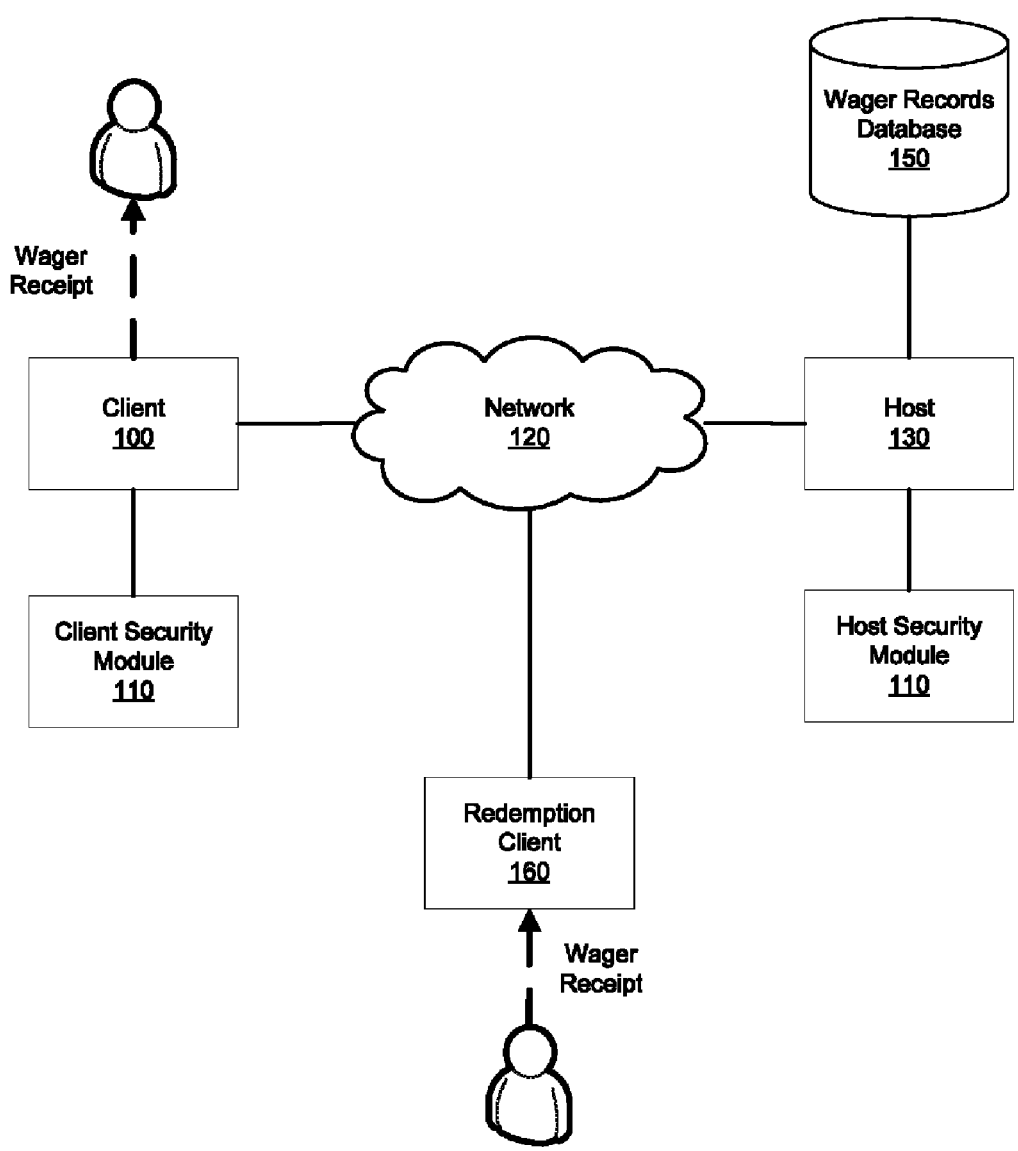
FIG. 3 illustrates an example system, according to an example embodiment of the present invention.

FIG. 3 illustrates an example system, according to an example embodiment of the present invention. A wageror or lottery ticket purchaser may place a wager or purchase a lottery ticket at client 100. Client 100 may include a client security module 110, e.g., a combination of secure software and/or secure hardware that performs the wager transaction flow described previously. The client security module 110 may include the generator for the security keys used in the example procedure previously described.

Client 100 may be connected via a network 120, such as a secure private network, the Internet, or other network with a host 130. The host 130 may be a central server operating the lottery system, or a server related to another gaming system, in a client-server mode with various clients. Alternatively, the host 130 may be provided in a more distributed fashion, with the functionality of the server spread across multiple systems. Whether distributed or centralized, the host 130 may include a security module 140, which may provide the security features of the host 130 previously described in the wager transaction flow and authentication process. The host 130 may include or have access to wager records 150, e.g., stored in a database accessible to the host 130.

Also connected to the host may be a client where lottery tickets, wagers, or other receipts may be presented for redemption. This redemption client 160 may be the same client as where the purchase takes place, a different client of the same type, or a client dedicated to redemptions.

The redemption client may have secure software and hardware configured to perform the client portions of the wager authentication procedure described previously, and to communicate the outcome of the authentication procedure to a clerk (for an attended terminal) or directly to the wageror.

Figure 4:
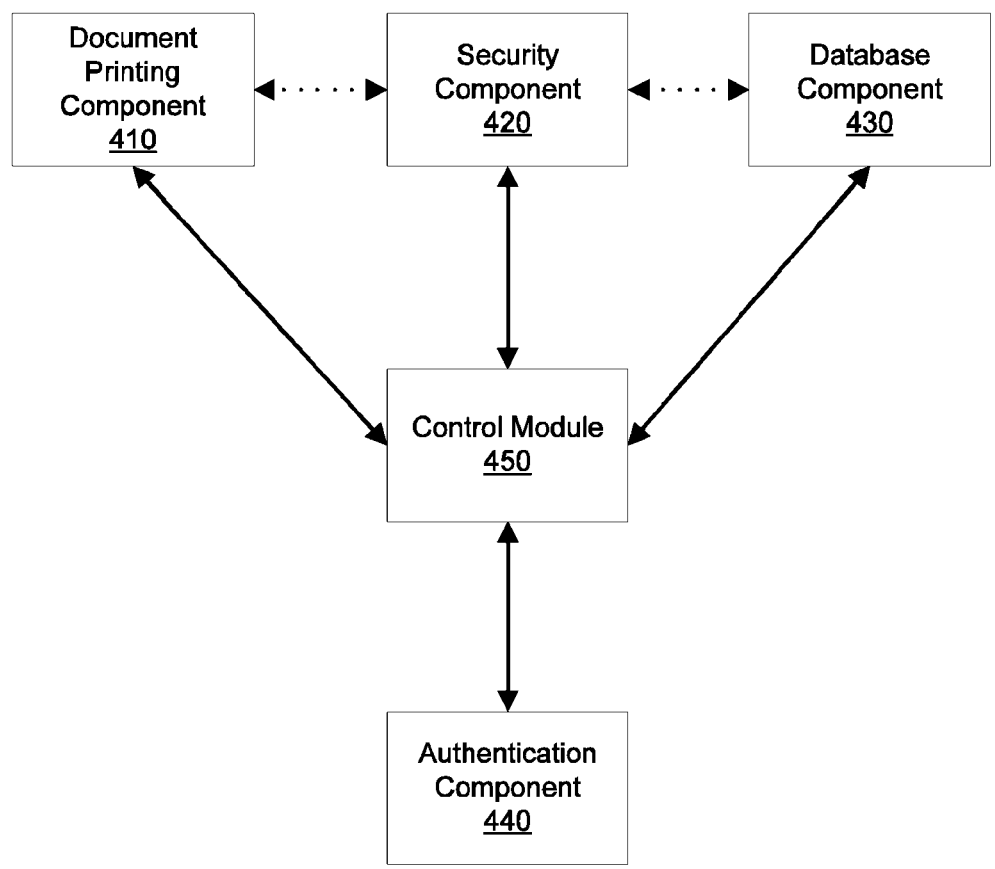
FIG. 4 illustrates an example logical architecture for an example system, according to an example embodiment of the present invention.

FIG. 4 illustrates an example logical architecture for an example system, according to an example embodiment of the present invention. The modules shown may be implemented entirely in software running on purely general purpose hardware, entirely in special purpose hardware, or using a combination of software and special purpose hardware.

The example system may include various logical components. A document printing component 410 may be configured to create the document, e.g., a lottery ticket or wager receipt in printed, electronic, or other form. The document may be created by printing, or by storing electronic information in an electronic record such as a smart card or RFID tag, or by other methods of record creation.

A security component 420 may be configured to provide security elements, e.g., stored security information such as keys or encrypted security information to both the document printing component 410 and the database component 430. When a document, such as a lottery ticket or wagering receipt is created, the security component may be configured to create a security key. The security key may be different for each document, or it may be used for several documents. The functionality of the security component may be located on a single system, or split across several systems, e.g., with a first portion of the security component on a client and an additional portion of the security component on a host.

A database component 430 may be configured to record the contents and other information about the document, e.g., the lottery ticket or wager receipt. While the database component may use a relational or non-relational database for recording, any other approach to reliably record the information may also be used.

An authentication component 440 may be configured to determine if a document, e.g., a lottery ticket or wager receipt presented for redemption is authentic. The functionality of the authentication component may be located on a single system, or split across several systems, e.g., with a first portion of the authentication component on a client and an additional portion of the authentication component on a host.

A control module 450 may be configured to coordinate and control the interactions of the other logical components. The control module may be centralized on a host, split across a server and clients in a client-server system, or completely distributed.

When a document is created, a security key may be created by the security component 420. A document token may also be created for the document, e.g., representing the information related to the wager or lottery entry. The document token value may be recorded by the database component, or may be derived from information in the database associated with the particular document, receipt, or lottery ticket. For example, the document token may be a cryptographic hash of the data on the document or it may be a fixed value.

The security component 420 may be configured to mathematically combine the document token and the security key, to produce a secured document token. The document token and the security key may be combined with any cryptographic method including, but not limited to:

Encrypting the document token via any symmetric encryption algorithm, such as DES, Triple DES, or AES, using the Security Key as the encryption key Creating a cryptographic hash of the combination of the security key and the document token, using any hash routine, such as MD5 or SHA-1. This method is commonly called Keyed-Hash Message Authentication Code (HMAC)

The security component may be configured to deliver the secured document token to the database, which may in turn be configured to record the secured document token along with the other information in the document. The security component may also be configured to deliver the security key to the document printing component, which may print the security key on the Document, e.g., on the lottery ticket or wager receipt, along with the rest of the information in the Document.

To authenticate the document, e.g., when a lottery ticket or wagering receipt is presented for redemption, the security key, printed on the ticket, may be delivered to the authentication component. Under direction of the control module, the document token may be obtained from the database, or alternatively enough information to determine the value of the document token may be retrieved. The secured document token may also be retrieved from the database. The secured document token and the document token may be sent to the authentication component.

The authentication component may be configured to mathematically combine the document token and the security key, in the same manner as the security component, to determine a candidate secured document token. The authentication component then may be configured to compare the candidate secured Document token with the secured document token from the database. If the candidate secured document token and secured document token match, then the document is deemed to be authentic.

The above example procedure relies upon the fact that it is mathematically infeasible to determine the value of the Security Key, even if the values of the document token and secured document token are known. This is the case, for example, when strong encryption algorithms or hash algorithms are used, such as Triple DES (TDES), AES, or HMAC.

In another example embodiment, the contents of the security key may be modified after it is used in the creation of the secured document token but before being printed on the document. This could be the case, for example, where it is desired to include additional information about the document which was not available at the time the secured document token was created. In this case a modified security key is created in such a way that the original contents of the security key may subsequently be determined, after removing the modifications. For example, a modified security key may be created by performing a bit-by-bit addition of certain data to the security key (commonly called an exclusive OR function).

It will be appreciated that all of the logical components described above may reside on separate physical devices, or they may alternatively be combined in any fashion on one or more devices. It will be also appreciated that multiple approaches to connecting the different logical components are possible. For example, all communications between components may be performed by the control module. Alternatively, some components could directly connect to other components. In a further alternative, all components could connect with other components, so a control module would not be needed.

In another example embodiment, some parts of the security key may be provided to the security component by another component, particularly the control module. For example, if the security component and document printing component both reside on a device of questionable security, it may be possible for someone with access to that device to replace the random generation of the security key with a non-random equivalent. By providing some elements of the Security Key by another, trusted component, it may be possible to verify that at least those elements were used in the encryption process.

Figure 5:
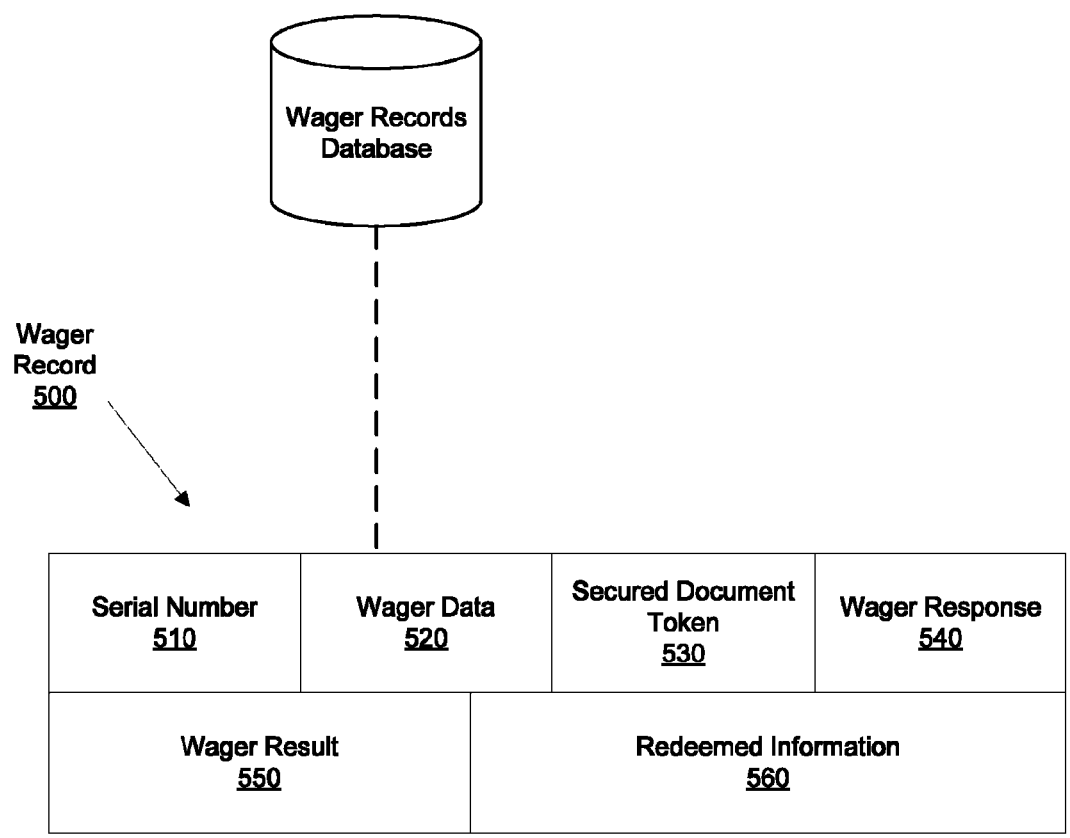
FIG. 5 illustrates example wager records, according to an example embodiment of the present invention.

FIG. 5 illustrates an example wager database and an example wager record, according to an example embodiment of the present invention. While the wager records are shown as a table in the illustration, the wager database may include records or entries or other stored data related to wagers or entries, which may be stored in a table, a list, a relational or non-relational database, or in any other suitable data structure or storage system. Moreover, it will be appreciated that the wager records need not be stored in a single table, but might also be normalized over multiple tables or entries with appropriate links or logical connections between them.

A wager record may include various information related to a particular wager, receipt or ticket.

For ease of illustration only a single record is illustrated. It will be appreciated that information for multiple wagers or transactions on the same ticket or receipt may be stored together in a single data structure, or may also be linked.

Wager record 500 may be a record for a single wager or entry in a lottery. The wager record 500 may include a unique unencrypted series number 510, which may be used as an index for the wager records. The wager record may also include wager data 520. The wager data 520 may include the identity of the jurisdiction (in a multi-jurisdiction system), the identity of the game for which the wager was placed, the time and location the wager was placed, the entries or predictions for the wager, whether they were selected by the wageror or automatically through a quick pick, and the price point of the wager or amount wagered. The wager record may also include the secured document token 530, which may be produced using the procedure described previously. The wager record may also include the wager response 540. The wager record may also include the wager result 550, which may indicate the outcome of the wager, e.g., the prize to be awarded if the wager is a winning wager. It will be appreciated, that in some implementations, the outcome might not be stored, but could be determined in real time by comparing the wager data with outcome data stored in a different location, such as a list of lottery results. The wager record may also include information on redemptions and/or attempted redemptions, e.g., the redeemed information 560 which may include a flag indicating the particular wager has already been redeemed, as well as information on where, when, and by whom the wager has been redeemed.

It will be appreciated that other information may also be stored in the wager records, and that the data may be arranged or stored in a variety of alternative approaches.

In one preferred example embodiment, the document is a wager on a lottery event. In this case, for example, the security component may be inside a point of sale device along with the document printing component. The database and authentication components may reside together on a centralized system. It will be appreciated that other types of wagering events such as horse racing, sports betting, online social games like Keno, and other types of wagering games may all be accommodated using similar systems and methods to the ones described in the present specification.

Figure 6:
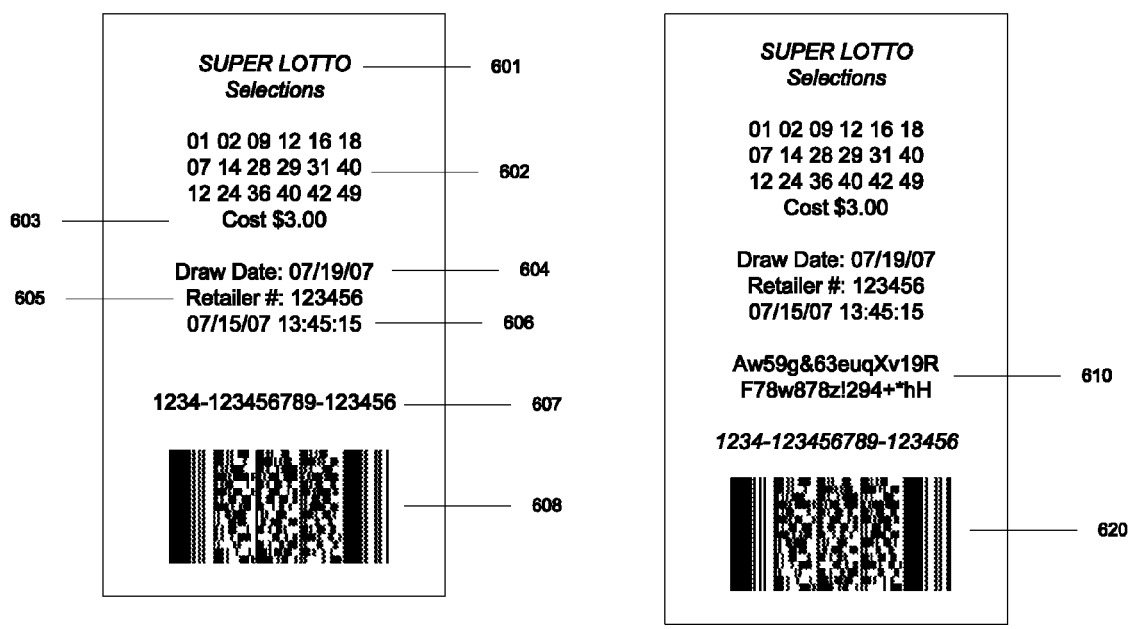
FIG. 6 illustrates example receipts, according to an example embodiment of the present invention.

FIG. 6 illustrates example wager receipts or lottery tickets, according to an example embodiment of the present invention. Wager receipt or lottery ticket 600 contains information such as game identifier 601, wager selections 602, wager cost or price point 603, date of draw 604 (or time of draw for a game played more often than daily), selling retailer number 605, and date and time of the wager 606. The Serial Number of the receipt 607 may be printed in the machine-readable bar code 608, or alternatively stored on the receipt in other ways, e.g., as an electronic record saved in a smart card or other computer memory.

Example wager receipt or lottery ticket 600' is an example of a wager receipt or lottery ticket produced by the example procedures and systems described previously. In lottery ticket 600', items 601 to 607 continue to appear as in lottery ticket 600, however a new field is introduced, 610, which contains a representation of the Modified Security Key. The bar code 620 may now contain both the Serial Number of the receipt 607 and the value of the Modified Security Key 610. To store a large amount of information including the encrypted keys, a two-dimensional bar code such as a PDF-217 bar code may be employed.

Note that it may not be necessary to provide the visual depiction of the modified security key 610, but by doing so the ticket may be manually authenticated in the case, for example, when the bar code reader is inoperable or the bar code has been accidentally defaced.

It will be appreciated that other approaches to storing the security information on the receipt may be employed, e.g., electronic or optical storage as in a smart card, in other printed coding mechanisms, in a programmable RFID tag, or other approaches.

In other example embodiments, the methods and systems described above may be modified to provide authentication for so-called "credit vouchers", "cash out slips" or "credit slips", e.g., from gaming machines such as slot machines, video poker machines, bingo machines, or video lottery terminals. While the example discussed below primarily discusses printed credit slips, it also may be used with credit media, such as smart cards, mag-stripe cards, or other types of articles where information is stored in, rather than printed on the voucher. Accordingly, it will be appreciated that wherever there is a discussion of printing, this could instead be storing on a voucher with a memory, and wherever there is scanning a voucher, there could also be reading from a memory on the voucher in which information is stored.

These gaming machines maintain a cash or credit balance that a player can use to wager on games on the machine. When a player decides to stop playing the machine, they may "cash out", and request a voucher, receipt, or other item which represents their cash balance, which may be a printed slip, an electronic receipt or in some other form. They can then use this "cash out" voucher, either to obtain credit at another game machine, or present it, e.g., at a redemption terminal, to obtain cash or other cash equivalents. For example, the cash out voucher may be presented to a cashier, a redemption kiosk, or other machine that will dispense the cash or other cash-equivalents for the amount shown on the voucher.

When a player cashes out at a gaming machine, the gaming machine may send information to a centralized server that may assign a unique serial number for the receipt and record the amount in a file. The central server may then send the serial number and other information to the gaming machine for printing on the receipt. Usually, the serial number is printed in a machine-readable format such as a bar code, although a human-readable balance may also be printed. Later, when the receipt is presented to another gaming machine or to a cashier or cash dispenser, the receiver may read the serial number and send it to the centralized system to determine authenticity and the amount of credit. If the receipt is authentic, and has not previously been redeemed, the centralized system may return an authorization to pay or grant credit. In this situation, an unscrupulous insider could know which receipts were produced and never presented for payment. The insider could easily re-create the receipt and use it to establish a credit.

Figure 7:
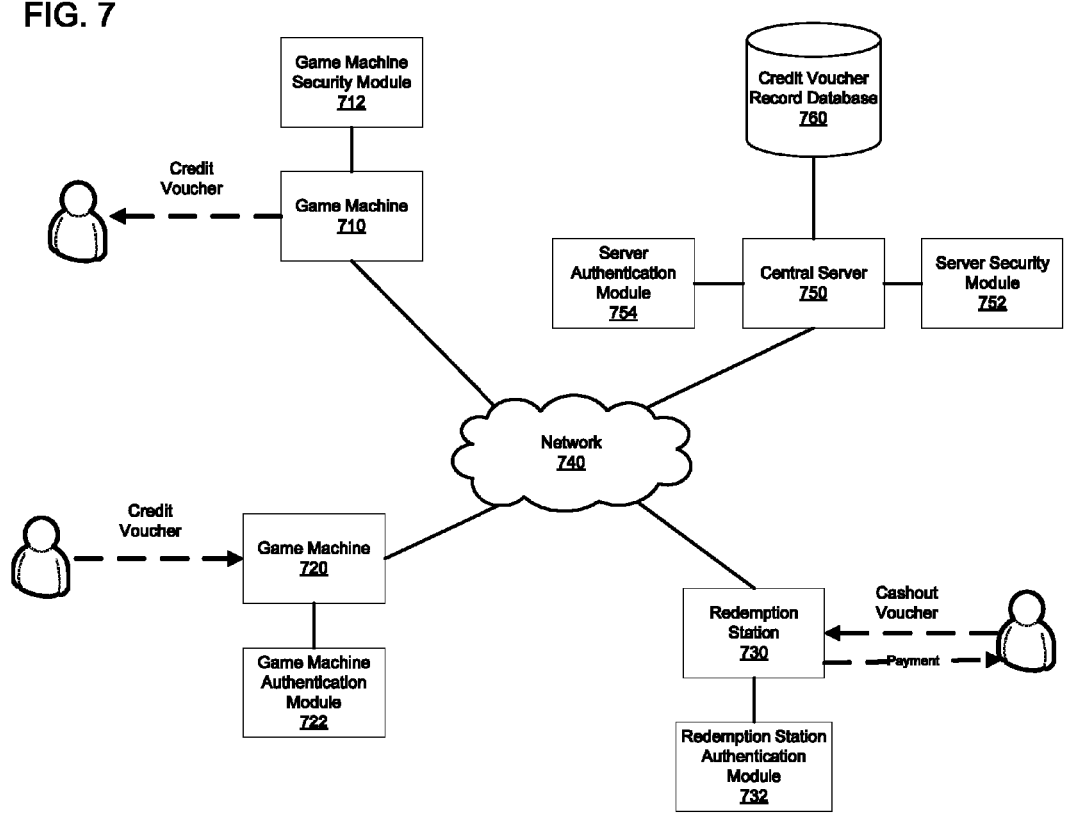
FIG. 7 illustrates an example system for issuing and authenticating wagering machine voucher slips, according to an example embodiment of the present invention.

FIG. 7 illustrates a system for producing and authenticating gaming machine credit vouchers, according to an example embodiment of the present invention. In the example embodiment, the originating gaming machine 710 could create a security key as described earlier along with a document token for the receipt. The security key may be created, and other elements of the creation of a secure voucher may be performed, at the game machine by a game machine security module 712, which may be implemented in software, hardware, or a combination thereof. For example, the security key may be a secure pseudo-random number created at the machine by the game machine security module 712. Rather than wagering data, the document token may include information regarding the credit and/or the credit voucher, as well as other information such as the identity of machine where the credit slip is being issued, the time, etc. The gaming machine 712, using the game machine security module 712 may create a secure document token using the security key and the document token, e.g., by using encryption or an encrypted hash to encrypt the document token as described previously. The document token, secure document token and other information may then be sent via a network 740 to a central server 750. The central server 750 may process the request for a secure credit voucher using a server security module 752. For example, the server may respond with response information, e.g., a serial number, a second key, and/or other new information that could be cryptographically or otherwise combined by the originating gaming machine with the security key to create a modified security key which may be printed on the receipt, e.g., as part of a bar code. The credit information, secure document token, and credit response may be stored in a voucher record database 760.

When the receipt is presented for credit at another game machine 720 with a authentication component 722 or for redemption at a redemption station 730 with a redemption station authentication component 732, information from the voucher may be read, e.g., by reading a bar code on the voucher or retrieving electronic information stored in the voucher. The information is sent to the host system which will authenticate the receipt using information from the voucher record database 760 that may be processed using the server authentication module 754 in a similar manner as described previously for lottery tickets.

Figure 8:
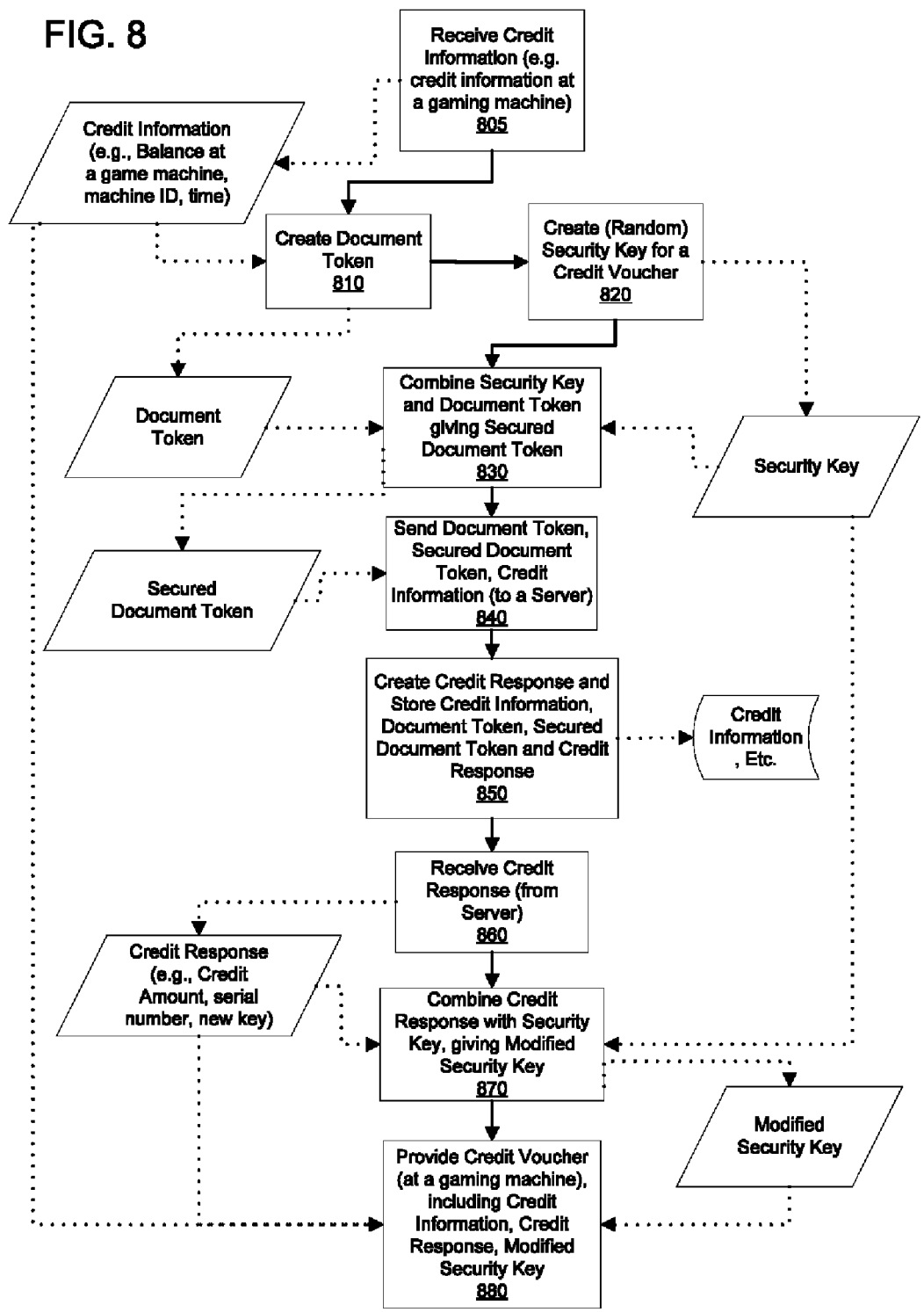
FIG. 8 illustrates an example procedure for issuing wagering machine credit vouchers, according to an example embodiment of the present invention.

FIG. 8 illustrates an example procedure for issuing a credit voucher according to an example embodiment of the present invention. According to the example procedure, credit information could be received at 805. For example, credit information could be received at a gaming machine, such as a slot machine, video poker machine, or video lottery terminal. It will be appreciated that the example procedure also may be used at on a personal computer, a mobile telephone, personal digital assistant or other type of client device on which a game can be played. The credit information may indicate that a player using, for example, the gaming machine is owed a certain amount of money or other compensation. At 810, a document token may be created which may include information regarding the credit and/or the credit voucher, as well as other information such as the identity of machine where the credit slip is being issued, the time, etc. In addition, at 820, a security key may be generated, possibly as described earlier. At 830, the document token and the security key could be combined to create a secured document token, again possibly in a manner similar to those described above. The document token, secured document token, credit information, and other information may then be sent to a central server or other record keeping system. At 850, a credit response may be created. The credit respond may include a serial number, a second key, balance information, and other that could be cryptographically or otherwise combined with the security key to create a modified security key. In addition, the credit information, secure document token, and credit response may be stored in a voucher record database. At 860, the credit response may be sent to a gaming machine, or other client device. At 870, the security key may be combined with the credit response to create a modified security key, again possibly in a manner similar to those described above. And, at 880, a credit voucher may be provided. The credit voucher may include the credit information, the credit response, the modified security key, and other relevant information. It will be appreciated that the credit voucher may be a printed credit slip, data stored on a smart card or mag-stripe card, or even data stored as an electronic voucher in a nonvolatile memory on a mobile telephone.

Figure 9:
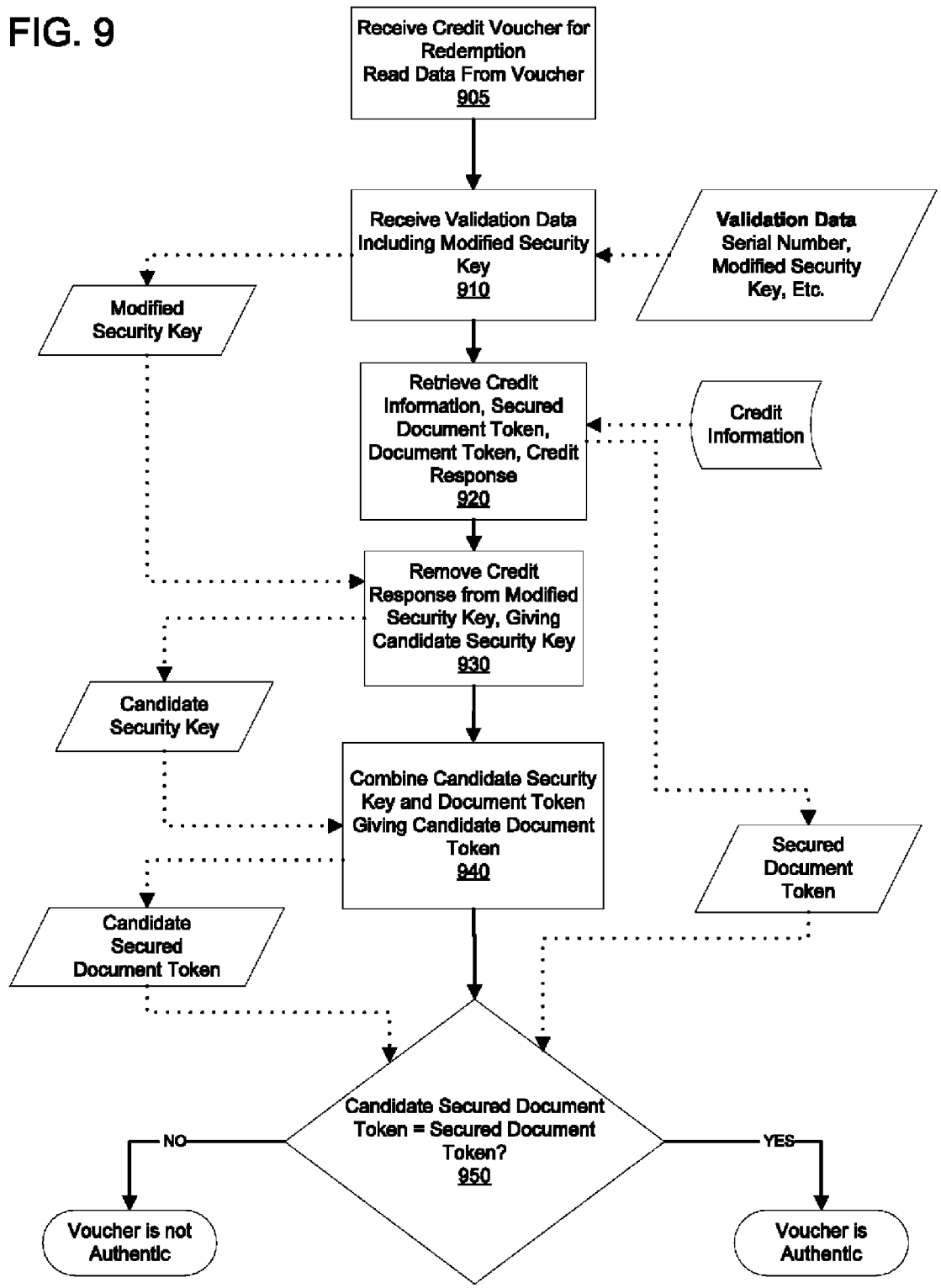
FIG. 9 illustrates an example procedure for authenticating wagering machine credit vouchers, according to an example embodiment of the present invention.

FIG. 9 illustrated a procedure for authenticating a credit voucher according to an example embodiment of the present invention. In 905, a credit voucher may be received, for example, at a gaming machine of the type described above, at another kind of gaming machine, at a dedicated redemption machine, at a clerk operated redemption device, or at any other acceptable redemption point. Validation data may then be received, e.g., by reading a bar code on the voucher or retrieving electronic information stored in the voucher. The validation data may include a serial number, the modified security key, or other information. At 920, credit information may be retrieved, including the credit information described above, the secured document token, the document token, the credit response, and other information. Once the information is retrieved, at 930, the credit response may be removed from the modified security key creating a candidate security key, possibly in a manner similar to those described above. At 940, the candidate security key may be combined with the document token, creating a candidate secured document token, again possibly in a manner similar to those described above. If, at 950, the resulting candidate secured document token matches the secured document token than the credit voucher is authentic and a person redeeming the voucher may be provided with money, prizes, credit, or any other form of compensation. If, however, the candidate secured document token does not match the secured document token, than the credit voucher may not be authentic.

Figure 10:
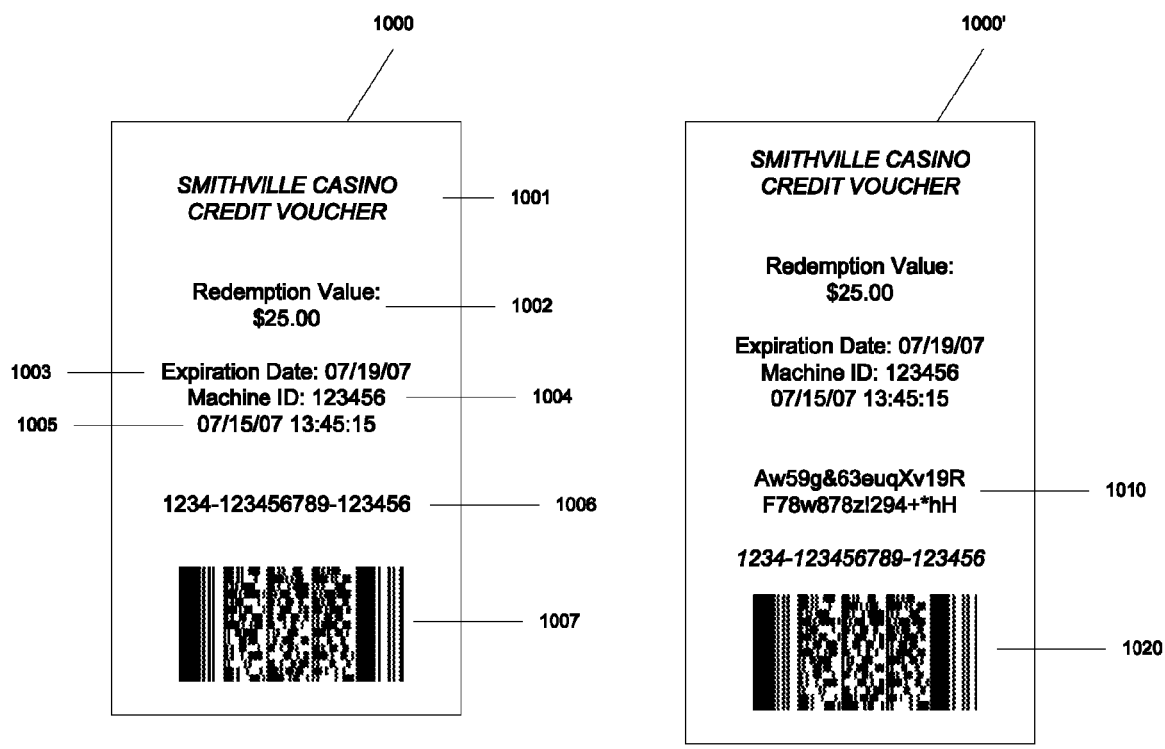
FIG. 10 illustrates example credit vouchers in accordance with different embodiments of the present invention.

FIG. 10 illustrates example credit vouchers in accordance with an example embodiment of the present invention. Credit voucher 1000 contains information such as a casino identifier 1001, a redemption value 1002, an expiration date 1003, the identification number of a gaming machine issuing the voucher 1004, and date and time that the voucher was issued 1005. The Serial Number of the credit voucher 1006 may be printed in the machine-readable bar code 1007, or alternatively stored on the voucher in other ways, e.g., as an electronic record saved in a smart card or other computer memory.

Example credit voucher 1000' is an example of a printed credit voucher produced by the example procedures and systems described previously. In credit voucher 1000', items 1001 to 1006 continue to appear as in credit voucher 1000, however a new field is introduced, 1010, which contains a representation of the modified security key. The barcode 1020 may now contain both the serial number of the credit voucher 1006 and the value of the modified security key 1010. As above, to store a large amount of information including the encrypted keys, a two-dimensional bar code such as a PDF-217 bar code may be employed. It will be appreciated that electronic vouchers may store information similar to what is printed on the printed credit voucher.

It will be appreciated that where documents, vouchers, slips, and receipts have been referred to in the present application, those items are referred to by way of example. It will be appreciated that other embodiments, e.g., electronic documents, slips, vouchers, or receipts storing information similar or identical to what is printed on printed documents are specifically contemplated by the present application.

Moreover, with reference to game machines, these machines may be dedicated game machines or terminals, or may be software implemented implementations of such machines on general purpose devices such as personal computers or cellular telephones, that emulate the functionality of dedicated gaming machines.

It will be appreciated that all of the disclosed methods, games and procedures described herein can be implemented using one or more computer programs or components. These components may be provided as a series of computer instructions on any conventional computer-readable medium, including RAM, ROM, flash memory, magnetic or optical disks, optical memory, or other storage media, downloaded from a network, e.g., from the Internet as a Java, Flash, or Shockwave program that is stored in a memory accessible to a processor. The instructions may be configured to be executed by a processor, which when executing the series of computer instructions performs or facilitates the performance of all or part of the disclosed methods, games, and procedures.

It will be appreciated that, in the above descriptions, reference has been made to "random numbers" and "random number generation." It will be appreciated that this recitation includes both random sampling of physical events, the use of a computer software pseudo random number generator, a firmware or hardware random or pseudo random number generator, or the reference to external real world events that are effectively random for the purposes of the game, e.g., the least significant digit in the total trading volume on a stock exchange. Access may also be provided to a secure random number generator outside the system itself, e.g., a utility or service that provides the results of random external events, such as ball drawings used in conventional Lotto type games or pseudo-random numbers generated on another computer system, or access to other information that while not perhaps not technically random in a purely theoretical mathematical sense, is unknowable in advance and effectively random for the purpose of the game, e.g., reference to particular sports or financial information, such as the last (least significant) digit in the total stock sales on the New York stock exchange, or the last (least significant) digit of the total number of pitches thrown in all the major league baseball games on a particular day. Where "random numbers" are referred to in the present application, it should be understood, unless expressly indicated otherwise, that any of the above approaches to random number generation are intended to be included. It is also appreciated that the random numbers can be used to determine game outcomes; however, the determination, unless specifically required by the language of the claims need not be done in any particular location, it may be on a dedicated machine, a server, accessed over a network, etc.

In the preceding specification, the present invention has been described with reference to specific example embodiments thereof. It will, however, be evident that various modifications and changes may be made thereunto without departing from the broader spirit and scope of the present invention as set forth in the claims that follow. The specification and drawings are accordingly to be regarded in an illustrative rather than restrictive sense.

The invention claimed is:

1. A method of authenticating a document from a wagering game machine, comprising:
   receiving credit information by a server, the credit information including information indicating a player's balance at the wagering game machine;
   creating, by the wagering game machine, a security key for the document, wherein the document is a wagering receipt, lottery ticket, or wagering machine credit voucher;
   creating, by the wagering game machine, a secured document token by encrypting a document token including the credit information with the security key;
   sending, by the wagering game machine, the secured document token to the server;
   sending, by the wagering game machine, a credit response from the server;

creating, by the wagering game machine, a modified security key by combining the credit response with the security key;

providing, by the wagering game machine, the document including the credit information, the credit response and the modified security key;

receiving, by a redemption device, a request to redeem the document for at least one of cash or game credit;

receiving, by the redemption device, the modified security key from the document;

retrieving, by the redemption device, the credit information, the secured document token, the document token and the credit response corresponding to the document;

obtaining, by the redemption device, a candidate security key from the modified security key received from the document by removing the retrieved credit response from the modified security key received from the document;

obtaining, by the redemption device, a candidate secured document token by encrypting the retrieved document token using the candidate security key;

determining, by the redemption device, whether the obtained candidate secured document token matches the retrieved secured document token; and indicating, by the redemption device, the document is authentic based on the determination of the matching.

2. The method of claim 1, wherein the credit information is transmitted from the wagering game machine to the server via a network; the security key is at least one of a random or pseudo-random number generated at the wagering game machine; the credit response is generated at the server and transmitted via the network to the wagering game machine; and the modified security key is created at the wagering game machine.

3. The method of claim 2, wherein the step of providing the document includes printing a document with a machine-readable code including the modified security key.

4. The method of claim 3, wherein the machine-readable code is a two-dimensional bar code.

5. The method of claim 3, wherein the credit information and the credit response are also printed on the document.

6. The method of claim 3, wherein providing the document includes storing a machine readable code including the modified security key on a memory in the document.

7. The method of claim 6, wherein the credit information and the credit response are also stored on the document.

8. The method of claim 1, wherein the encrypting includes at least one of a symmetric encryption algorithm or a cryptographic hash of the combination.

9. The method of claim 8, wherein the encrypting includes at least one of DES, Triple DES, AES, MD5, SHA-1, or HMAC.

10. The method of claim 1, wherein the wagering game machine is a video slot machine.

11. The method of claim 1, wherein the wagering game machine is a video lottery terminal.

12. The method of claim 1, wherein the wagering game machine is at least one of a personal computer, mobile phone, or personal digital assistant.

13. The method of claim 1, wherein the redemption device is a dedicated redemption terminal, the method further comprising: in response to the indication that the document is authentic, paying the document holder cash equivalent to the value of the document.

14. The method of claim 1, wherein the redemption device is a second gaming machine, the method further comprising: in response to the indication that the document is authentic, providing game credit at the second gaming machine equivalent to the value of the document.

* * * * *